(12) United States Patent
Baek et al.

(10) Patent No.: US 12,347,882 B2
(45) Date of Patent: Jul. 1, 2025

(54) BATTERY MODULE AND BATTERY PACK INCLUDING THE SAME

(71) Applicant: LG Energy Solution, Ltd., Seoul (KR)

(72) Inventors: Seung Ryul Baek, Daejeon (KR); Sung Dae Kim, Daejeon (KR); Junyeob Seong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 777 days.

(21) Appl. No.: 17/432,347

(22) PCT Filed: Mar. 13, 2020

(86) PCT No.: PCT/KR2020/003503
§ 371 (c)(1),
(2) Date: Aug. 19, 2021

(87) PCT Pub. No.: WO2020/251141
PCT Pub. Date: Dec. 17, 2020

(65) Prior Publication Data
US 2022/0158288 A1    May 19, 2022

(30) Foreign Application Priority Data

Jun. 12, 2019  (KR) .......................... 10-2019-0069231

(51) Int. Cl.
*H01M 50/244*  (2021.01)
*H01M 10/613*  (2014.01)
(Continued)

(52) U.S. Cl.
CPC ....... *H01M 50/244* (2021.01); *H01M 10/613* (2015.04); *H01M 10/647* (2015.04);
(Continued)

(58) Field of Classification Search
CPC ............. H01M 50/244; H01M 50/211; H01M 50/291; H01M 50/249; H01M 50/20;
(Continued)

(56) References Cited

U.S. PATENT DOCUMENTS 9,153,799 B2   10/2015   Kim et al.
9,306,194 B2   4/2016    Kim et al.
(Continued)

FOREIGN PATENT DOCUMENTS

CN    105322215 A    2/2016
CN    108475831 A    8/2018
(Continued)

OTHER PUBLICATIONS

International Search Report for Application No. PCT/KR2020/003503, dated Jun. 30, 2020, 2 pages.
(Continued)

*Primary Examiner* — Matthew W Van Oudenaren
(74) *Attorney, Agent, or Firm* — Lerner David LLP

(57) ABSTRACT

A battery module according to one embodiment of the present disclosure comprises a battery cell stack in which a plurality of battery cells are stacked, a first frame member accommodating the battery cell stack and having an open upper part, and a second frame member covering the battery cell stack from an upper portion of the first frame member. A surface of the battery cell stack extending parallel to the stacking direction of the plurality of battery cells is attached to the bottom part of the first frame member. A stepped part is formed on one side of the bottom part of the first frame member, and a protrusion part of the battery cell protrudes toward the stepped part.

19 Claims, 16 Drawing Sheets

(51) Int. Cl.
  *H01M 10/647*  (2014.01)
  *H01M 10/653*  (2014.01)
  *H01M 50/211*  (2021.01)
  *H01M 50/291*  (2021.01)

(52) U.S. Cl.
  CPC ....... *H01M 10/653* (2015.04); *H01M 50/211* (2021.01); *H01M 50/291* (2021.01)

(58) Field of Classification Search
  CPC .. H01M 50/24; H01M 10/613; H01M 10/615; H01M 10/617; H01M 10/647; H01M 10/625; H01M 10/6554; H01M 10/658
  See application file for complete search history.

(56) References Cited

U.S. PATENT DOCUMENTS

| | | | |
|---|---|---|---|
| 9,865,845 B2 | 1/2018 | Kim et al. | |
| 9,882,178 B2 | 1/2018 | Kim et al. | |
| 10,103,368 B2 | 10/2018 | Gunna et al. | |
| 10,141,546 B2 | 11/2018 | Kim et al. | |
| 2007/0207377 A1* | 9/2007 | Han | H01M 50/507 |
| | | | 429/185 |
| 2008/0160395 A1 | 7/2008 | Okada et al. | |
| 2013/0083453 A1 | 4/2013 | Kobayashi | |
| 2014/0295235 A1 | 10/2014 | Jung | |
| 2014/0356672 A1* | 12/2014 | Lee | H01M 10/425 |
| | | | 429/186 |
| 2015/0099146 A1 | 4/2015 | Kim et al. | |
| 2015/0162648 A1 | 6/2015 | Yang et al. | |
| 2016/0233465 A1 | 8/2016 | Lee et al. | |
| 2017/0025719 A1 | 1/2017 | Yamada et al. | |
| 2018/0375077 A1* | 12/2018 | Shin | H01M 50/20 |
| 2019/0131596 A1 | 5/2019 | Yang et al. | |
| 2019/0229313 A1 | 7/2019 | Lee et al. | |
| 2019/0237832 A1* | 8/2019 | Ju | H01M 10/613 |
| 2021/0028423 A1 | 1/2021 | Shin et al. | |

FOREIGN PATENT DOCUMENTS

| | | | |
|---|---|---|---|
| CN | 109643768 A | 4/2019 | |
| CN | 208738326 U | 4/2019 | |
| CN | 109863619 A | 6/2019 | |
| EP | 2381506 A1 | 10/2011 | |
| JP | 2001313018 A | 11/2001 | |
| JP | 2009529217 A | 8/2009 | |
| JP | 2012015365 A | 1/2012 | |
| JP | 4947893 B2 | 6/2012 | |
| JP | 2012160347 A | 8/2012 | |
| JP | 2013073918 A | 4/2013 | |
| KR | 20130126159 A | 11/2013 | |
| KR | 20140073636 A | 6/2014 | |
| KR | 20140118734 A | 10/2014 | |
| KR | 101520902 B1 | 5/2015 | |
| KR | 2017-0010972 A | 2/2017 | |
| KR | 20170050509 A | 5/2017 | |
| KR | 20180020547 A | 2/2018 | |
| WO | 2015151884 A1 | 10/2015 | |
| WO | 2018106026 A1 | 6/2018 | |
| WO | WO2018106026 | * | 6/2018 |
| WO | 2019027149 A1 | 2/2019 | |
| WO | 2019088625 A1 | 5/2019 | |

OTHER PUBLICATIONS

Extended European Search Report including Written Opinion for Application No. 20821896.6 dated Jun. 22, 2022, pp. 1-12.
Partial Supplementary European Search Report for European Patent Application No. 20821896.6 dated Mar. 10, 2022, 14 pages.

* cited by examiner

[FIG. 1]
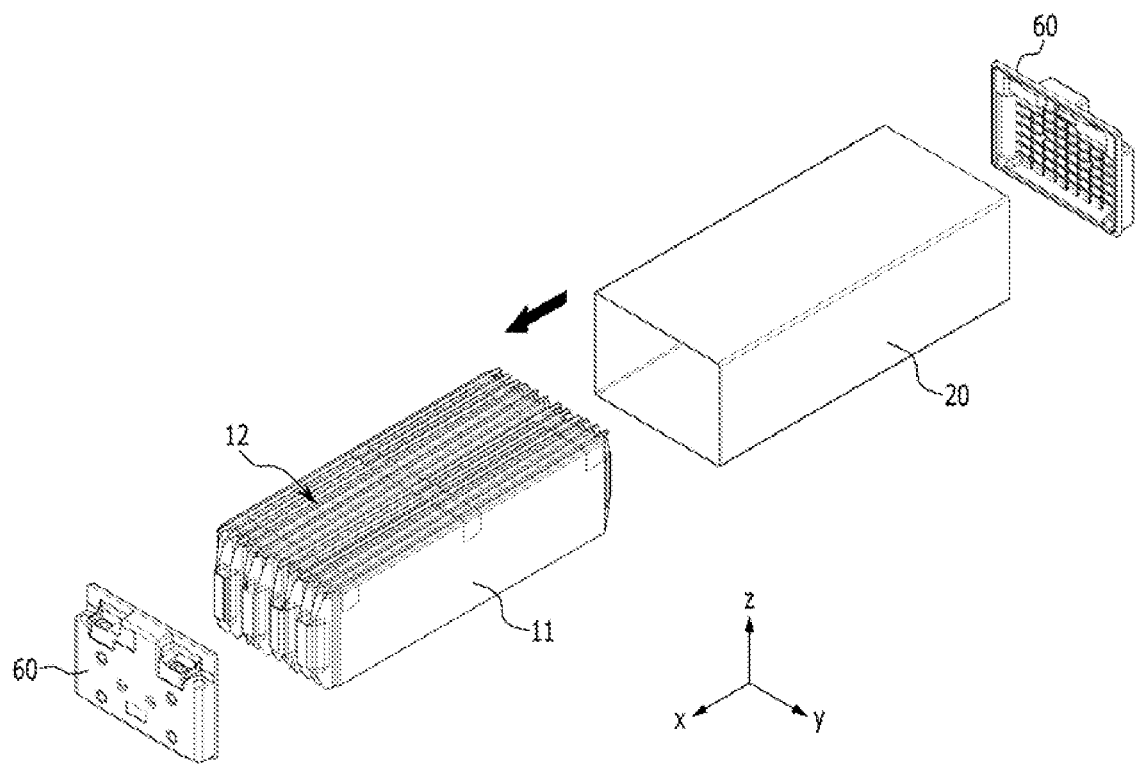

[FIG. 2]
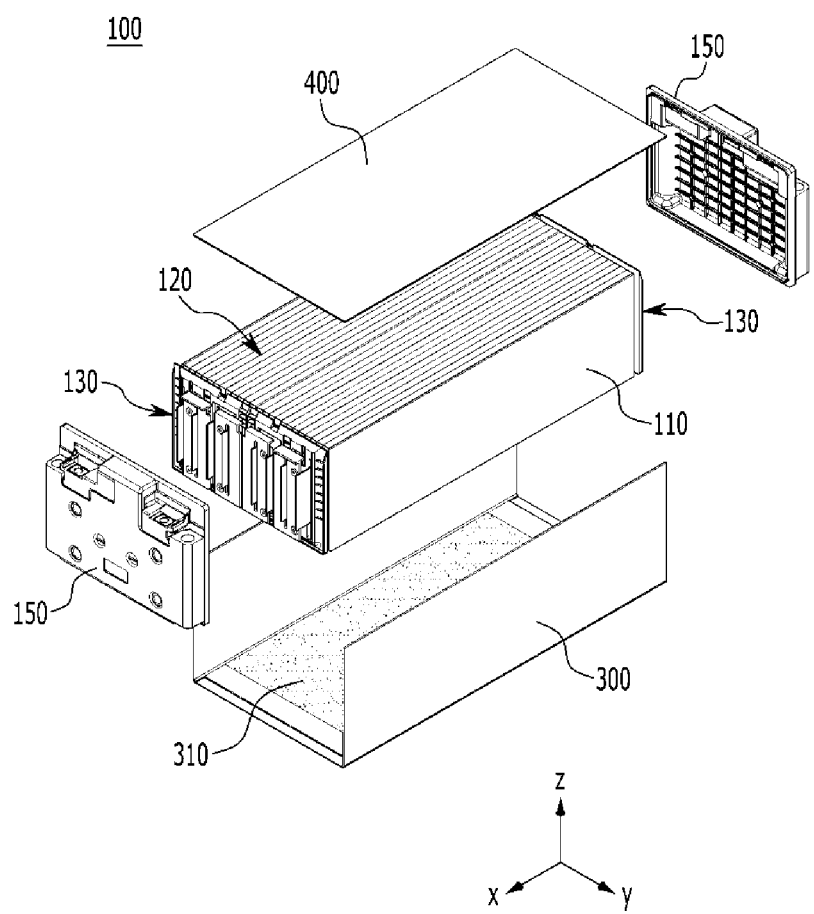

[FIG. 3]
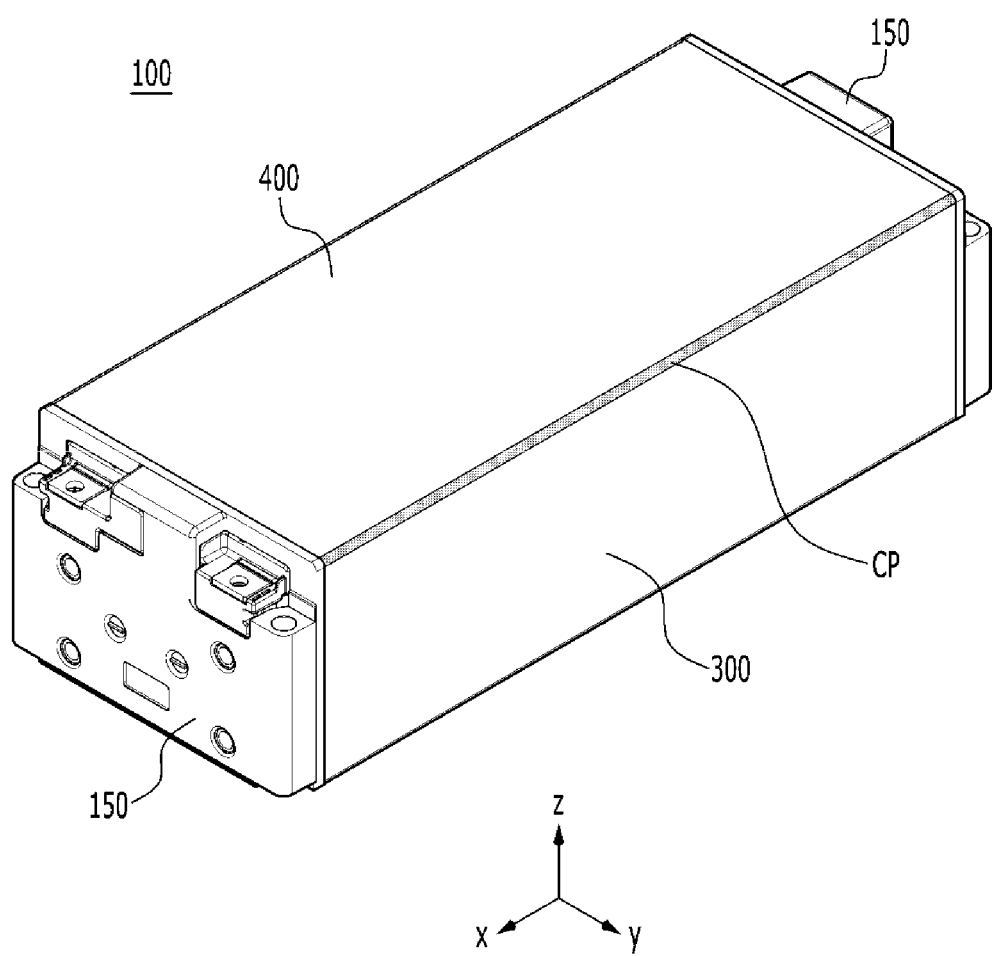

[FIG. 4]
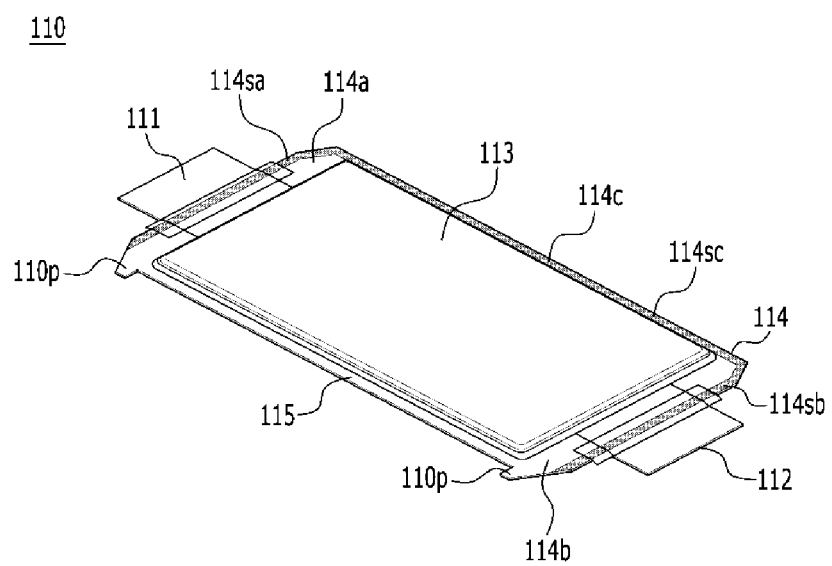

[FIG. 5]
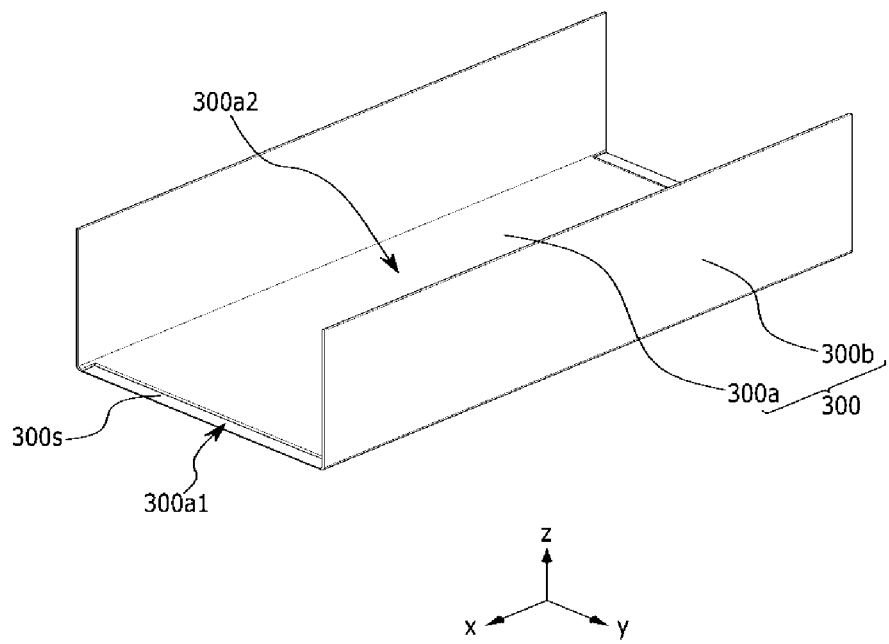

[FIG. 6]
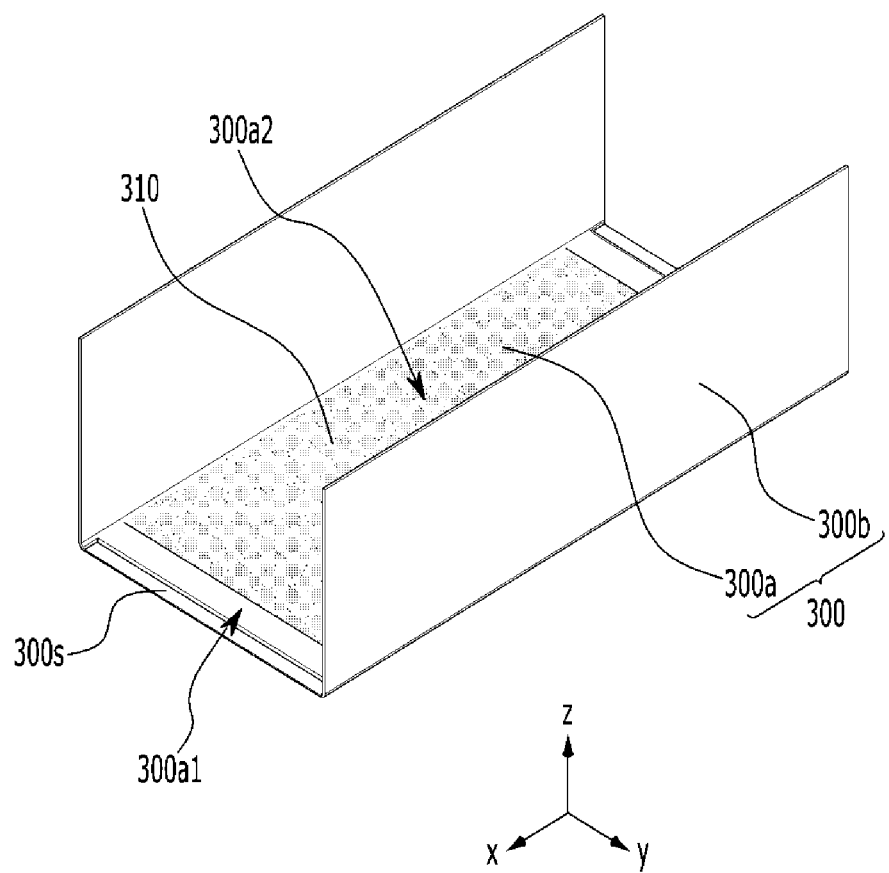

[FIG. 7]
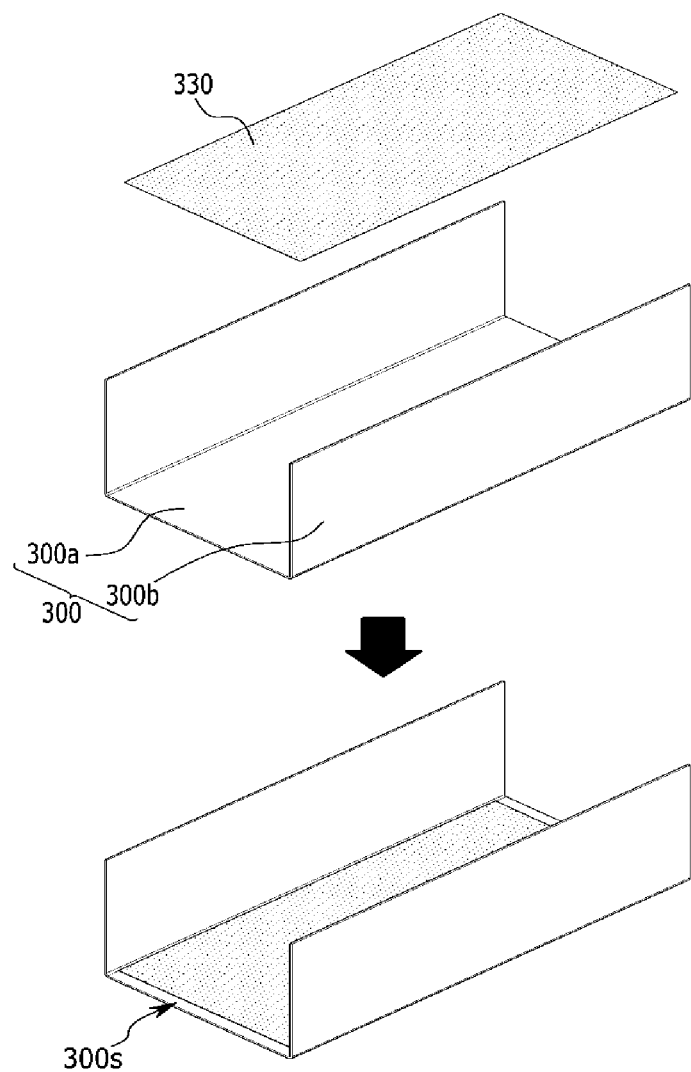

[FIG. 8]
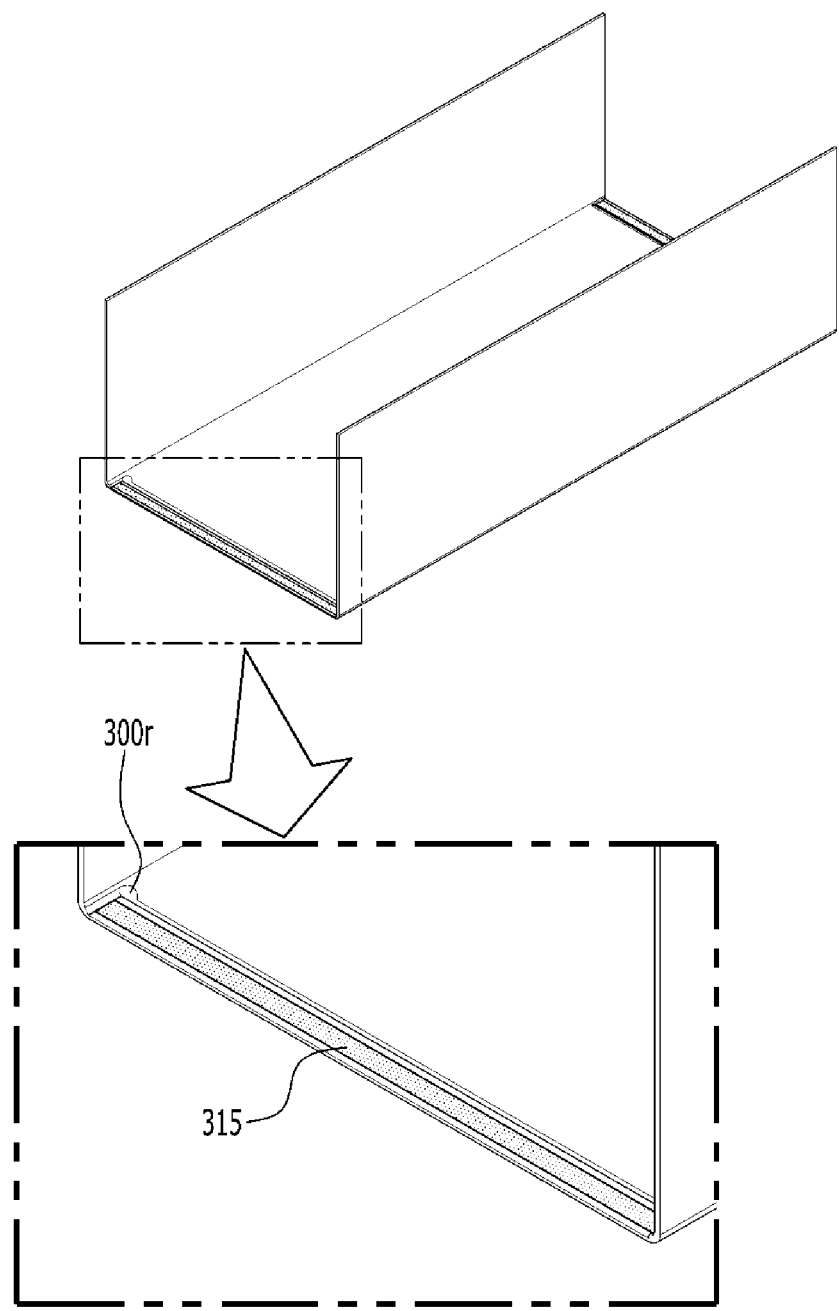

[FIG. 9]
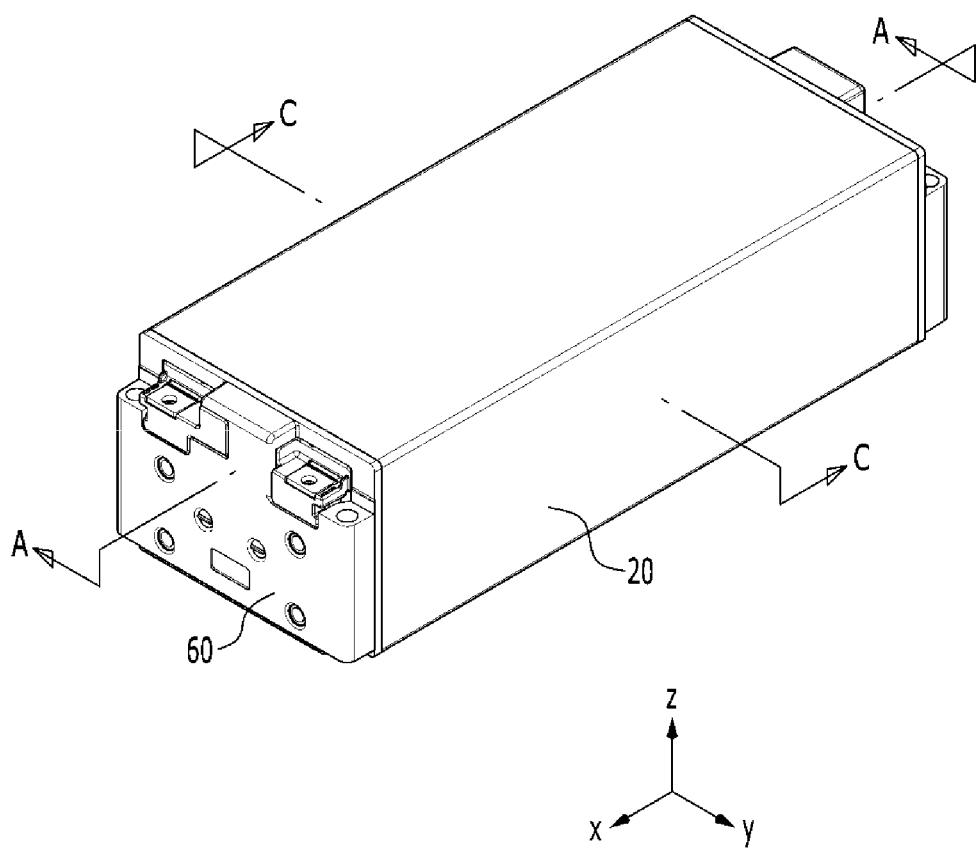

【FIG. 10】
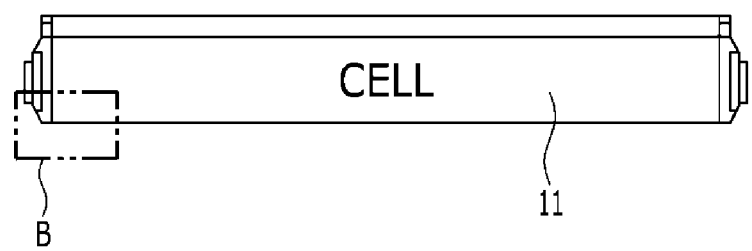
【FIG. 11】
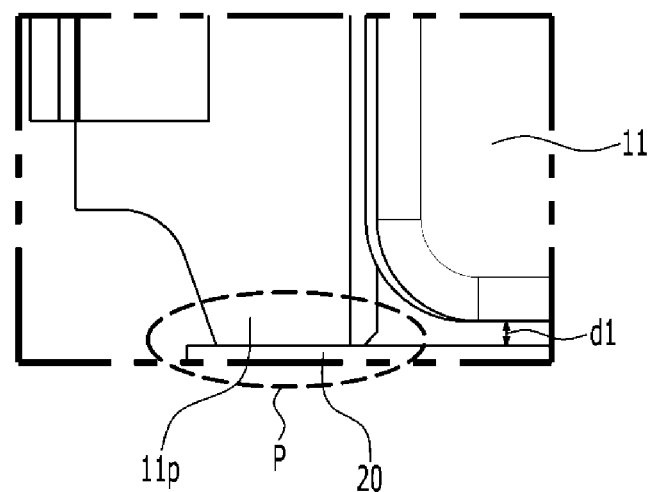

[FIG. 12]
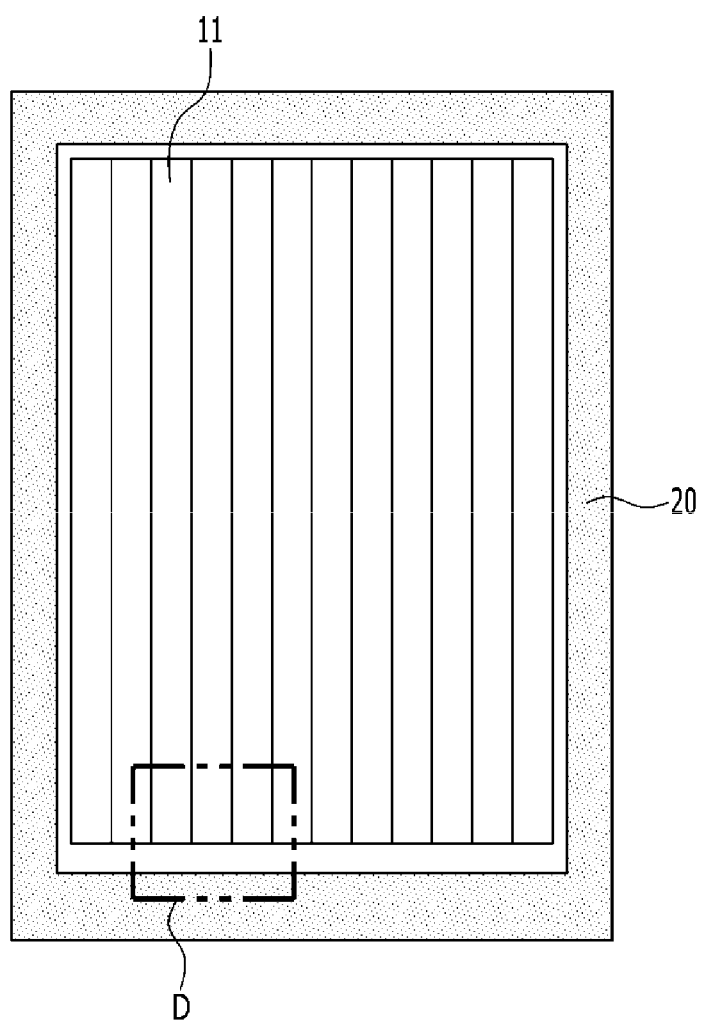

[FIG. 13]
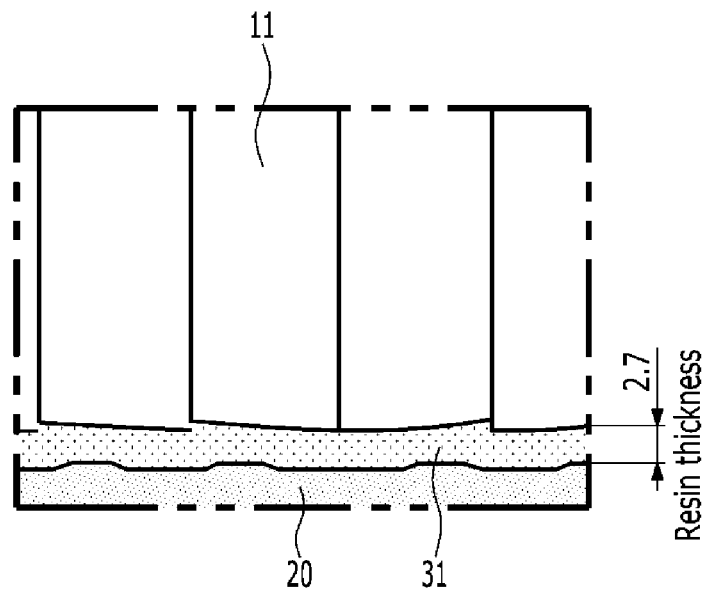
[FIG. 14]
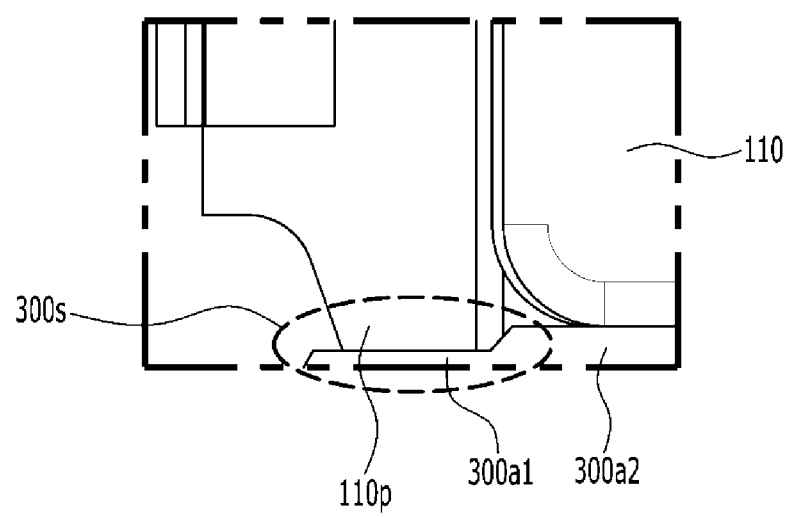

[FIG. 15]
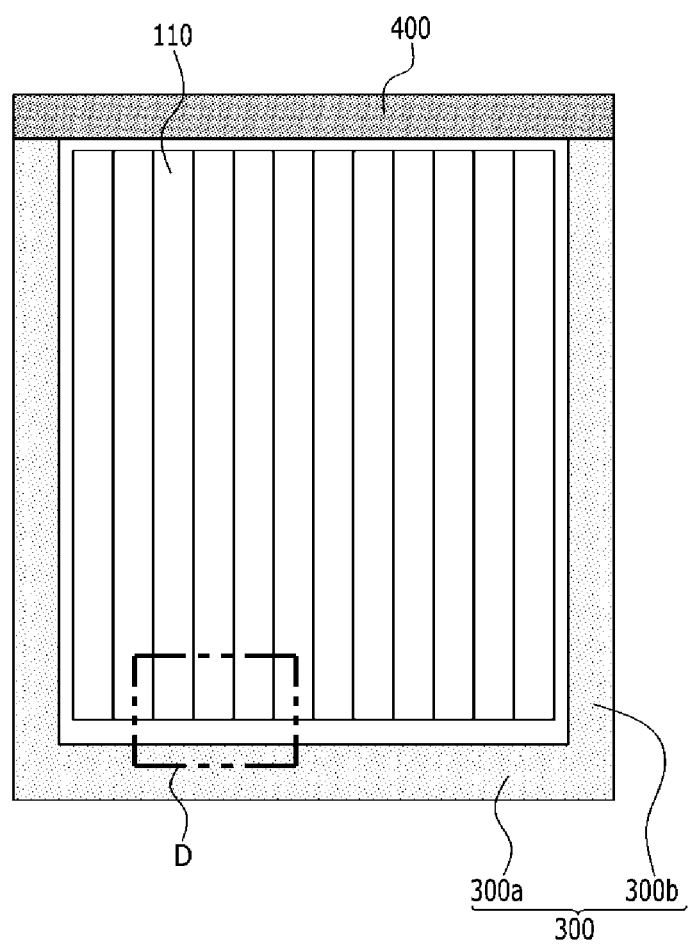

[FIG. 16]
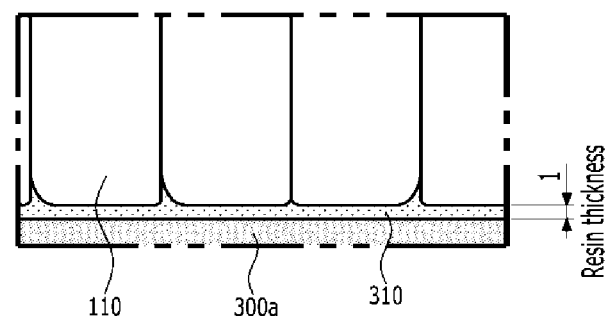

【FIG. 17】
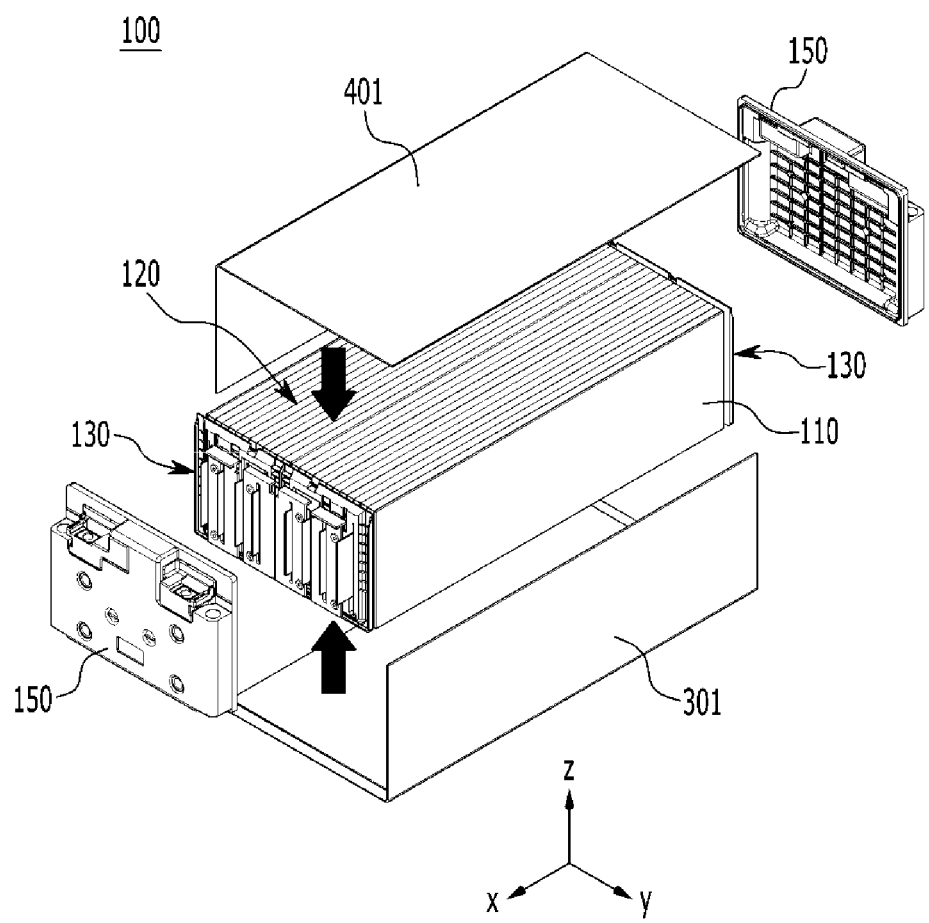

[FIG. 18]
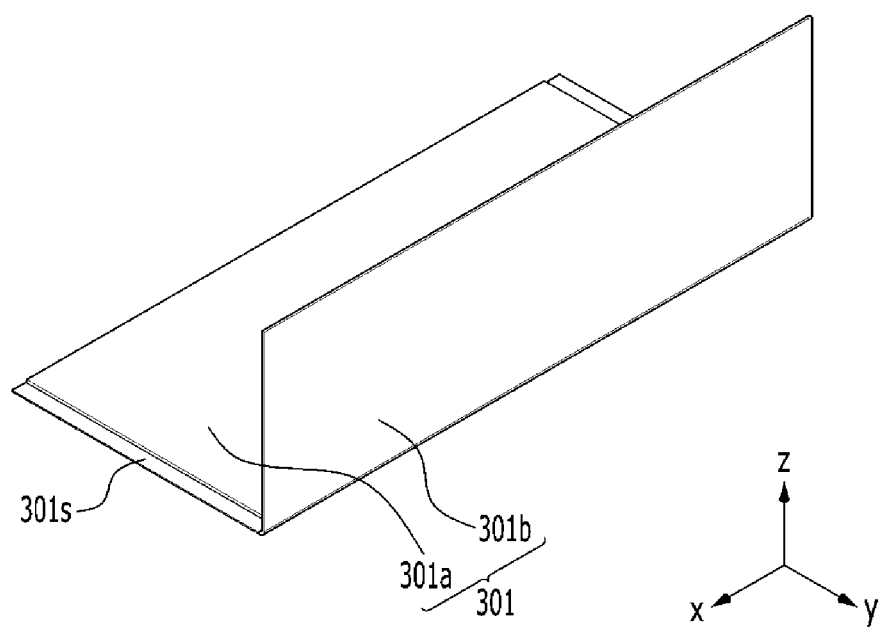

BATTERY MODULE AND BATTERY PACK INCLUDING THE SAME

CROSS-REFERENCE TO RELATED APPLICATIONS

This application is a national phase entry under 35 U.S.C. § 371 of International Application No. PCT/KR2020/003503 filed Mar. 13, 2020, which claims priority from Korean Patent Application No. 10-2019-0069231 filed on Jun. 12, 2019, the disclosure of which is incorporated herein by reference in its entirety.

TECHNICAL FIELD

The present disclosure relates to a battery module and a battery pack including the same, and more particularly, to a battery module that improves space utilization rate and minimizes the amount of a thermally conductive resin used, and a battery pack including the same.

BACKGROUND ART

Secondary batteries, which are easily applied to various product groups and have electrical characteristics such as high energy density, are universally applied not only for a portable device but also for an electric vehicle (EV) or a hybrid electric vehicle (HEV), an energy storage system or the like, which is driven by an electric driving source. Such secondary batteries are attracting attention as a new environmentally-friendly energy source for improving energy efficiency since they provide a primary advantage of remarkably reducing the use of fossil fuels and also do not generate by-products from the use of energy at all.

Small-sized mobile devices use one or several battery cells for each device, whereas middle- or large-sized devices such as vehicles require high power and large capacity. Therefore, a middle- or large-sized battery module having a plurality of battery cells electrically connected to one another is used.

Preferably, a middle- or large-sized battery module is manufactured so as to have as small a size and weight as possible. Consequently, a prismatic battery or a pouch-shaped battery, which can be stacked with high integration and has a small weight to capacity ratio, is usually used as a battery cell of the middle- or large-sized battery module. Meanwhile, in order to protect the cell stack from external shock, heat, or vibration, the battery module may include a frame member whose front and back surfaces are opened so as to accommodate the battery cell stack in an internal space.

FIG. 1 is a perspective view showing a battery module having a conventional mono frame.

Referring to FIG. 1, the battery module may include a battery cell stack 12 formed by stacking a plurality of battery cells 11, a mono frame 20 whose front and back surfaces are opened so as to cover the battery cell stack 12, and an end plate 60 covering the front and back surfaces of the mono frame 20. To form such a battery module, as shown by the arrow in FIG. 1, horizontal assembly is required so that the battery cell stack 12 is inserted into the open front surface or back surface of the mono frame 20 along the X-axis direction. However, it is necessary to ensure a sufficient clearance between the battery cell stack 12 and the mono frame 20 so that such horizontal assembly can be stabilized. Here, the clearance means a gap generated by fitting or the like.

A thermally conductive resin layer (not shown) may be formed between the battery cell stack 12 and the mono frame 20. The thermally conductive resin layer may serve to transfer heat generated from the battery cell stack to the outside of the battery module and fix the battery cell stack in the battery module. When the clearance becomes large, the amount of the thermally conductive resin layer used may be increased more than necessary.

In addition, in consideration of the maximum height of the battery cell stack 12 and the assembly tolerance in the insertion process, the height of the mono frame 20 must designed to be large and thus, unnecessarily wasted space may occur.

DETAILED DESCRIPTION OF THE INVENTION

Technical Problem

The present disclosure has been made to solve the above-mentioned problems, and an object of the present disclosure is to provide a battery module that improves space utilization rate and minimizes the amount of a thermally conductive resin used by modifying the structure of the frame member that covers the battery cell stack, and a battery pack including the same.

However, the problem to be solved by embodiments of the present disclosure is not limited to the above-described problems, and can be variously expanded within the scope of the technical idea included in the present disclosure.

Technical Solution

A battery module according to one embodiment of the present disclosure comprises a battery cell stack in which a plurality of battery cells are stacked, and a first module frame accommodating the battery cell stack and having an opened upper part, and a second frame member covering the battery cell stack from an upper portion of the first frame member, wherein a surface of the battery cell stack perpendicular to the stacking direction of the plurality of battery cells is attached to the bottom part of the first frame member, and wherein a stepped part is formed on one side of the bottom part of the first frame member, and the battery cell includes a protrusion part protruding toward the stepped part.

The bottom part of the first frame member includes a first part and a second part, the first part is located at the edge based on the longitudinal direction of the battery cell, the second part is located inside the first part, the first part corresponds to the stepped part, and the thickness of the first part may be thinner than that of the second part.

The battery module may further include a thermally conductive resin layer located between the first frame member and the battery cell stack in the second part.

The battery module may further include an insulating sheet located between the stepped part and the protrusion part of the battery cell.

An undercut shape may be formed in the stepped part.

The insulating sheet may be formed of polyethylene terephthalate (PET).

The battery module further includes a plate covering the bottom part excluding an end part of the bottom part, and the stepped part may be formed by a height difference between the plate and the end part of the bottom part.

The plate may be formed of the same material as the bottom part.

The first frame member is a U-shaped frame accommodating the battery cell stack and having an opened upper part, and the second frame member may be an upper plate covering the battery cell stack in the opened upper part of the U-shaped frame.

A lower surface of the battery cell stack perpendicular to the stacking direction of the plurality of battery cells may be attached to the bottom part of the U-shaped frame.

The battery module further includes an end plate coupled to each of the opened both sides of the U-shaped frame, and the opened both sides of the U-shaped frame may face each other based on a protruding direction of the electrode lead of the battery cell stack.

The U-shaped frame includes a bottom part and two side surface parts facing each other while being connected by the bottom part, and the distance between the two side surface parts may be the same as the width of the upper plate.

The first frame member is a first L-shaped frame that accommodates the battery cell stack and whose upper part and one side surface are opened, the second frame member is a second L-shaped frame whose lower part and other side surface are opened, and the first L-shaped frame and the second L-shaped frame are engaged to surround four surfaces of the battery cell stack.

A lower surface of the battery cell stack perpendicular to the stacking direction of the plurality of battery cells may be attached to the lower surface of the first L-shaped frame.

A protrusion part may be formed in the width direction of the battery cell.

A battery pack according to another embodiment of the present disclosure includes the battery module described above.

Advantageous Effects

According to the embodiments, the U-shaped frame or L-shaped frame can be implemented to thereby reduce the clearance between the battery cell stack and the frame and improve a space utilization rate as compared with the prior art.

Further, by processing the edge of the bottom part of the U-shaped frame or L-shaped frame, the gap between the battery cell stack and the frame can be reduced, thereby improving the space utilization in the height direction and minimizing the coating amount of the thermally conductive resin.

BRIEF DESCRIPTION OF THE DRAWINGS

FIG. 1 is an exploded perspective view showing a battery module having a conventional mono frame.

FIG. 2 is an exploded perspective view showing a battery module according to an embodiment of the present disclosure.

FIG. 3 is a perspective view showing a state in which the components constituting the battery module of FIG. 2 are combined.

FIG. 4 is a perspective view showing a pouch-shaped battery according to an embodiment of the present disclosure.

FIG. 5 is a perspective view showing a U-shaped frame in the battery module of FIG. 2.

FIG. 6 is a perspective view showing a thermally conductive resin layer formed on the bottom part of the U-shaped frame of FIG. 5.

FIG. 7 is a perspective view showing a method of forming a stepped part according to another embodiment of the present disclosure.

FIG. 8 is a perspective view showing an insulating sheet included in the battery module according to another embodiment of the present disclosure.

FIG. 9 is a perspective view showing a battery module according to a comparative example.

FIG. 10 is a cross-sectional view taken along the line A-A of FIG. 9.

FIG. 11 is an enlarged view of part B of FIG. 10.

FIG. 12 is a cross-sectional view taken along the line C-C of FIG. 9.

FIG. 13 is an enlarged view of part D of FIG. 12.

FIG. 14 is a view showing a part of a cross section taken along the XZ plane of FIG. 3.

FIG. 15 is a cross-sectional view taken along the YZ plane of FIG. 3.

FIG. 16 is an enlarged view of part D of FIG. 15.

FIG. 17 is an exploded perspective view showing an L-shaped frame according to another embodiment of the present disclosure.

FIG. 18 is a perspective view showing the L-shaped frame of FIG. 17.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" a certain component, it means that it can further include other components, without excluding the other components, unless otherwise stated.

Further, throughout the specification, when referred to as "planar", it means when a target portion is viewed from the top, and when referred to as "cross-sectional", it means when a target portion is viewed from the side of a cross section cut vertically.

FIG. 2 is an exploded perspective view showing a battery module according to an embodiment of the present disclosure. FIG. 3 is a perspective view showing a state in which the components constituting the battery module of FIG. 2 are combined. FIG. 4 is a perspective view showing a pouch-shaped battery according to an embodiment of the present disclosure.

Referring to FIG. 2 and FIG. 3, the battery module 100 according to the present embodiment includes a battery cell stack 120 including a plurality of battery cells 110, a U-shaped frame 300 whose upper, front and back surfaces are opened, an upper plate 400 covering an upper part of the battery cell stack 120, end plates 150 located on the front surface and the back surface of the battery cell stack 120, respectively, and a busbar frame 130 located between the battery cell stack 120 and the end plate 150.

Both open sides of the U-shaped frame 300 are referred to as a first side and a second side, respectively, and the U-shaped frame 300 consists of a plate-shaped structure that is bent so as to continuously cover the front, lower and back surfaces adjacent to each other, among the remaining outer surfaces excluding the surface of the battery cell stack 120 corresponding to the first side and the second side. The upper surface corresponding to the lower surface of the U-shaped frame 300 is opened.

The upper plate 400 has a single plate-shaped structure that covers the remaining upper surface excluding the front, lower and back surfaces that are covered by the U-shaped frame 300. The U-shaped frame 300 and the upper plate 400 may form a structure covering the battery cell stack 120 by being coupled by welding or the like in a state in which mutually corresponding edge parts are in contact. That is, the U-shaped frame 300 and the upper plate 400 may have a coupling part (CP) formed at mutually corresponding edge parts by a coupling method such as welding.

The battery cell stack 120 includes a plurality of battery cells 110 that are stacked in one direction, and the plurality of battery cells 110 may be stacked in the Y-axis direction as shown in FIG. 2. The battery cell 110 is preferably a pouch-shaped battery cell. For example, referring to FIG. 4, the battery cell 110 according to the present embodiment has a structure in which two electrode leads 111 and 112 face away from each other and project from one end part 114*a* and the other end part 114*b* of the battery body 113, respectively. The battery cell 110 is manufactured by adhering both end parts 114*a* and 114*b* of the battery case 114 and one side surface 114*c* connecting them in a state where the electrode stack (not shown) was housed in the battery case 114. In other words, the battery cell 110 according to the present embodiment has a total of three sealing parts 114*sa*, 114*sb* and 114*sc*; the sealing parts 114*sa*, 114*sb* and 114*sc* have a structure that is sealed by a method such as thermal fusion; and the remaining other one side part may be formed of a connecting part 115. Between both end parts 114*a* and 114*b* of the battery case 114 may be defined as the longitudinal direction of the battery cell 110, and between the one side portion 114*c* connecting the both end parts 114*a* and 114*b* of the battery case 114 and the connection part 115 may be defined as the width direction of the battery cell 110.

The connection part 115 is an area extending along one long border of the battery cell 110, and a protrusion part 110*p* of the battery cell 110 may be formed at an end part of the connection part 115. The protrusion part 110*p* may be formed on at least one of both end parts of the connection part 115, and may protrude in a direction perpendicular to a direction in which the connection part 115 extends. The protrusion part 110*p* may be located between one of the sealing portions 114*sa* and 114*sb* of the respective end parts 114*a* and 114*b* of the battery case 114 and the connection part 115.

The battery case 114 is generally composed of a laminated structure of a resin layer/metal thin film layer/resin layer. For example, in the case where the surface of the battery case is composed of an O (oriented)-nylon layer, when a plurality of battery cells are stacked in order to form a middle- or large-sized battery module, they tend to slip easily due to an external impact. Therefore, in order to prevent this and maintain a stable laminated structure of the battery cells, an adhesive member, for example, a cohesive type adhesive agent such as a double-sided tape or a chemical adhesive agent coupled by a chemical reaction during coupling, can be attached to the surface of the battery case to form a battery cell stack 120. In the present embodiment, the battery cell stack 120 is stacked in the Y-axis direction, is housed inside the U-shaped frame 300 in the Z-axis direction, and is cooled by a thermally conductive resin layer described later. As a comparative example thereto, there is a case in which the battery cells are formed of cartridge-shaped parts, and the fixing between the battery cells is made by assembling the battery module frame. In this comparative example, due to the presence of a cartridge-shaped component, there is little or no cooling action, or the cooling may proceed toward the surface of the battery cell, and the cooling does not properly proceed in the height direction of the battery module.

FIG. 5 is a perspective view showing a U-shaped frame in the battery module of FIG. 2. FIG. 6 is a perspective view showing a thermally conductive resin layer formed on the bottom part of the U-shaped frame of FIG. 5.

Referring to FIG. 5, the U-shaped frame 300 according to the present embodiment includes a bottom part 300*a* and two side portions 300*b* facing each other. Before the battery cell stack 120 described in FIG. 2 is attached to the bottom part 300*a* of the U-shaped frame 300, a thermally conductive resin is coated onto the bottom part 300*a* of the U-shaped frame 300, and the thermally conductive resin is cured to form the thermally conductive resin layer 310 shown in FIG. 6.

Before forming the thermally conductive resin layer 310, that is, before the coated thermally conductive resin is cured, the battery cell stack 120 may be moved along a direction perpendicular to the bottom part 300*a* of the U-shaped frame 300 so as to attach the battery cell stack 120 to the bottom part 300*a* of the U-shaped frame 300. Then, the thermally conductive resin layer 310 formed by curing the thermally conductive resin is located between the bottom part 300*a* of the U-shaped frame 300 and the battery cell stack 120. Referring to FIG. 2 and FIG. 6, the thermally conductive resin layer 310 may serve to transfer heat generated from the battery cell 110 to the bottom of the battery module 100 and fix the battery cell stack 120.

The bottom part 300*a* of the U-shaped frame according to the present embodiment includes a first part 300*a*1 and a second part 300*a*2, the first part 300*a*1 is located at the edge based on the longitudinal direction of the battery cell 110, and the second part 300*a*2 is located inside the first part 300*a*1. The thermally conductive resin layer 310 may be formed on the second part 300*a*2. Here, the longitudinal direction of the battery cell 110 may be the X-axis direction of FIG. 5. In this case, the thickness of the first part 300*a*1 is thinner than that of the second part 300*a*2, so that a stepped portion 300*s* may be formed in the first part 300*a*1. Here, the stepped part refers to a structure generated by a difference in height from the periphery.

The stepped part 300*s* may be formed by processing the bottom part 300*a* of the U-shaped frame or press-compressing a part of the bottom part 300*a* of the U-shaped frame. As will be described later, the battery cell stack 120 is attached to the bottom part 300a of the U-shaped frame 300 so that the protrusion part 110p of the battery cell 110 according to the present embodiment protrudes toward the stepped part 300s.

Referring back to FIGS. 2 and 3, the widths of the side surface part 300b and the upper plate 400 of the U-shaped frame 300 according to the present embodiment may be identical to each other. In other words, the edge part along the X-axis direction of the upper plate 400 and the edge part along the X-axis direction of the side surface part 300b of the U-shaped frame 300 can directly meet and be coupled by a method such as welding.

FIG. 7 is a perspective view showing a method of forming a stepped part according to another embodiment of the present disclosure.

The stepped part 300s described in FIGS. 5 and 6 is formed by processing the bottom part 300a of the U-shaped frame 300 or press-compressing a part of the bottom part 300a of the U-shaped frame, and a first part 300a1 and a second part 300a2 having mutually different thicknesses are formed on the bottom part 300a of the U-shaped frame. However, in the stepped part 300s according to the embodiment of FIG. 7, the thickness of the bottom part 300a of the U-shaped frame 300 may be uniform as a whole. In order to form such a structure, referring to FIG. 7, a plate 330 may be additionally formed on the bottom part 300a of the U-shaped frame 300. The plate 330 may form a stepped part 300s by covering the bottom part 300a of the U-shaped frame 300 except for both end parts of the bottom part 300a of the U-shaped frame 300. That is, the stepped part 300s may be formed due to a height difference between the plate 330 and the end part of the bottom part 300a. The plate 330 may be formed of the same material as the bottom part 300a, and may be formed of aluminum or the like.

FIG. 8 is a perspective view showing an insulating sheet included in the battery module according to another embodiment of the present disclosure.

Referring to FIGS. 2 and 8, the battery module according to the present embodiment may further include an insulating sheet 315 formed in the stepped part 300s. The insulating sheet 315 may be formed of polyethylene terephthalate (PET), and may be located between the protrusion part 110p and the stepped part 300s of the battery cell 110. In this case, the insulating sheet 315 may come into contact with the protrusion part 110p of the battery cell 110. Additionally, an undercut shape 300r may be formed in the stepped part 300s. The undercut shape 300r may have a round shape. The shape of the insulating sheet 315 may be simplified by the undercut shape 300r formed in the stepped part 300s. That is, a corner of the insulating sheet 315 adjacent to the undercut shape 300r may be formed in a right angle shape.

FIG. 9 is a perspective view showing a battery module according to a comparative example. FIG. 10 is a cross-sectional view taken along the line A-A of FIG. 9. FIG. 11 is an enlarged view of part B of FIG. 10. FIG. 12 is a cross-sectional view taken along the line C-C of FIG. 9. FIG. 13 is an enlarged view of part D of FIG. 12.

Referring to FIGS. 9 to 13, the thickness of the bottom part of the mono frame 20 is uniform, and thus, in the battery module according to the comparative example, a step level is not formed in the bottom part of the mono frame 20 as shown in FIG. 11. Thus, in the comparative example, a separation distance d1 is generated between the battery cell 11 and the bottom part of the mono frame 20 due to the protrusion part 11p of the battery cell 11, and the space utilization rate may be decreased by that distance. In addition, the amount of the thermally conductive resin used for forming the thermally conductive resin layer may be increased by the separation distance d1. For example, as shown in FIG. 13, the resin thickness between the bottom part of the mono frame 20 and the battery cell 11 may be approximately 2.7 mm.

FIG. 14 is a view showing a part of a cross section taken along the XZ plane of FIG. 3. FIG. 15 is a cross-sectional view taken along the YZ plane of FIG. 3. FIG. 16 is an enlarged view of part D of FIG. 15.

Referring to FIGS. 3 and 14, the battery module 100 according to the present embodiment includes a bottom part of a U-shaped frame 300 having a first part 300a1 and a second part 300a2. The first part 300a1 and the second part 300a2 have mutually different thicknesses, and the protrusion part 110p of the battery cell 110 is protruded toward the stepped part 300s formed in the first part 300a1. Therefore, a step level can be caught between the first part 300a1 and the second part 300a2, thus preventing sliding due to external impact. In addition, it is possible to reduce the gap between the battery cell 110 and the frame member through the processing of the bottom part 300a of the U-shaped frame. This gap reduction effect can maximize the overall space efficiency by causing a gap reduction effect and synergy that can be obtained by assembling in the height direction.

Referring to FIGS. 15 and 16, the protrusion part 10p of the battery cell 110 described in FIG. 14 is formed in the stepped part 300s, whereby not only a separation distance between the battery cell 110 and the bottom part 300a of the U-shaped frame 300 is minimized to increase space efficiency, but also the amount of the thermally conductive resin used to form the thermally conductive resin layer 310 can be reduced so that costs can be reduced. Therefore, the cooling efficiency can also be improved. For example, as shown in FIG. 16, the resin thickness between the bottom portion 300a of the U-shaped frame 300 and the battery cell 110 according to the present embodiment may be approximately 1.0 mm.

FIG. 17 is an exploded perspective view showing an L-shaped frame according to another embodiment of the present disclosure. FIG. 18 is a perspective view showing the L-shaped frame of FIG. 17.

Referring to FIGS. 17 and 18, the battery module 100 according to the present embodiment includes a battery cell stack 120 including a plurality of battery cells 110; a first L-shaped frame 301 whose upper, front and back surfaces are opened; a second L-shaped frame 401 whose lower, front and back surfaces are opened; end plates 150 located on the front surface and the back surface of the battery cell stack 120, respectively; and a busbar frame 130 located between the battery cell stack 120 and the end plate 150.

Both open sides of the U-shaped frame 300 are referred to as a first side and a second side, respectively, and the first U-shaped frame 301 consists of a plate-shaped structure that is bent so as to continuously cover the lower surface and the one side surface adjacent thereto, among the remaining outer surfaces excluding the surface of the battery cell stack 120 corresponding to the first side and the second side. Similarly, both open sides of the second U-shaped frame 401 are referred to as a first side and a second side, respectively, and the second U-shaped frame 401 consists of a plate-shaped structure that is bent so as to continuously cover the upper surface and another side surface adjacent thereto, among the remaining outer surfaces excluding the surface of the battery cell stack 120 corresponding to the first side and the second side.

The first U-shaped frame 301 and the second U-shaped frame 401 may form a structure covering the battery cell stack 120 by being coupled by welding or the like in a state in which mutually corresponding edge parts are in contact. The first L-shaped frame 301 and the second L-shaped frame 401 may be engaged to surround four surfaces of the battery cell stack 120.

The battery cell stack 120 includes a plurality of battery cells 110 that are stacked in one direction, and the plurality of battery cells 110 may be stacked in the Y-axis direction as shown in FIG. 17. The battery cell 110 is preferably a pouch-shaped battery cell.

Referring to FIG. 18, the first L-shaped frame 301 according to the present embodiment includes a lower surface 301a and a side surface part 301b bent from the lower surface 301a. Before the battery cell stack 120 described in FIG. 2 is attached to the bottom part 300a of the first U-shaped frame 301, a thermally conductive resin is coated onto the bottom part 300a of the first U-shaped frame 301, and the thermally conductive resin is cured to form the thermally conductive resin layer (not shown). Thereafter, the battery cell stack 120 may be moved in a direction perpendicular to the lower surface 301a of the first L-shaped frame 301 so as to attach the battery cell stack 120 to the lower surface 301a of the first L-shaped frame 30. In this case, the thermally conductive resin layer is located between the lower surface 301a of the first L-shaped frame 301 and the battery cell stack 120. The thermally conductive resin layer may serve to transfer heat generated from the battery cell 110 to the bottom of the battery module 100 and fix the battery cell stack 120.

In addition to the differences described above, the contents described above with regard to the U-shaped frame can be applied to the present embodiment. In addition, the U-shaped frame and the L-shaped frame described herein may have a configuration corresponding to the frame member. For example, the U-shaped frame corresponds to the first frame member, the upper plate corresponds to the second frame member, the first L-shaped frame may correspond to the first frame member, and the second L-shaped frame may correspond to the second frame member. A battery module having a U-shaped frame and a battery module having an L-shaped frame may share common features in that they have a protrusion part protruding toward a stepped part and a structure related thereto.

Meanwhile, one or more battery modules according to an embodiment of the present disclosure can be packaged in a pack case to form a battery pack.

The above-mentioned battery module and a battery pack including the same may be applied to various devices. These devices may be applied to vehicles such as an electric bicycle, an electric vehicle, or a hybrid vehicle, but the present disclosure is not limited thereto but rather can be applied to various devices that can use the battery module and the battery pack including the same (which also belongs to the scope of the present disclosure).

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
300: U-shaped frame
400: upper plate
301, 401: L-shaped frame
310: thermally conductive resin layer

The invention claimed is:

1. An assembly of battery components comprising:
a battery cell stack in which a plurality of battery cells are stacked along a stacking direction,
a first frame member accommodating the battery cell stack and having an open upper portion, and
a second frame member covering the battery cell stack and arranged to extend over the open upper portion of the first frame member,
wherein a surface of the battery cell stack extending parallel to the stacking direction is attached to a bottom portion of the first frame member, the bottom portion being opposite the open upper portion,
wherein a first region of the bottom portion of the first frame member at at least one end of the bottom portion has a step formed therein, the bottom portion including a second region spaced away from the at least one end, wherein the step is defined by a recessed surface of the bottom portion spaced further away from the open upper portion of the first frame member than a surface of the bottom portion in the second region, wherein the battery cells include a protrusion protruding toward and received within the step, and
wherein the first frame member includes an insulating sheet positioned entirely within the step, such that the insulating sheet is arranged to come into contact with the protrusion of the battery cells.

2. The assembly according to claim 1, wherein
the bottom portion of the first frame member includes opposing edges along a longitudinal direction of the battery cells, the first region being located at at least a first edge of the opposing edges, and the second region being located away from the at least a first edge,
wherein a thickness of the bottom portion is thinner in the first region than in the second region.

3. The assembly according to claim 2, further comprising a thermally conductive resin layer located between the first frame member and the battery cell stack in the second region.

4. The assembly according to claim 1, wherein the step includes an undercut portion.

5. The assembly according to claim 1, wherein the insulating sheet is formed of polyethylene terephthalate (PET).

6. The assembly according to claim 1, further comprising a plate covering the bottom portion except for the at least one end of the bottom portion,
wherein the step is defined by a height difference between the plate and the at least one end of the bottom portion.

7. The assembly according to claim 6, wherein the plate is formed of the same material as the bottom portion.

8. The assembly according to claim 1, wherein
the first frame member is a U-shaped frame accommodating the battery cell stack and defining the open upper portion, and
the second frame member is an upper plate positioned in the open upper portion of the U-shaped frame.

9. The assembly according to claim 8, wherein
a lower surface of the battery cell stack extending parallel to the stacking direction of the plurality of battery cells is attached to the bottom portion of the U-shaped frame.

10. The assembly according to claim 9, wherein the U-shaped frame defines opposing open sides, the assembly further comprising an end plate coupled to each of the open sides, wherein the open sides of the U-shaped frame oppose each along a direction in which electrode leads of the battery cell stack protrude.

11. The assembly according to claim 8, wherein
the U-shaped frame includes a bottom portion and two side portions facing each other and connected by the bottom portion, and
a distance between the two side portions is the same as a width of the upper plate.

12. The assembly according to claim 1, wherein
the first frame member is a first L-shaped frame that accommodates the battery cell stack and that has an open side portion in addition to the open upper portion,
the second frame member is a second L-shaped frame having an open lower portion and an open second side portion, the second side portion being opposed to the open side portion of the first L-shaped frame, and
the first L-shaped frame and the second L-shaped frame are engaged so as to surround four surfaces of the battery cell stack.

13. The assembly according to claim 12, wherein
a lower surface of the battery cell stack extending parallel to the stacking direction of the plurality of battery cells is attached to the bottom portion of the first L-shaped frame.

14. The assembly according to claim 1, wherein
the protrusion protrudes along a width direction of the battery cells.

15. The assembly according to claim 1, wherein the assembly is a battery module.

16. An assembly of battery components comprising:
a battery cell stack in which a plurality of battery cells are stacked along a stacking direction,
a first frame member accommodating the battery cell stack and having an open upper portion, and
a second frame member covering the battery cell stack and arranged to extend over the open upper portion of the first frame member,
wherein a surface of the battery cell stack extending parallel to the stacking direction is attached to a bottom portion of the first frame member, the bottom portion being opposite the open upper portion, wherein at least one end of the bottom portion of the first frame member has a step formed therein, and wherein the battery cells include a protrusion protruding toward the step,
the assembly further comprising a plate covering the bottom portion except for the at least one end of the bottom portion,
wherein the step is defined by a height difference between the plate and the at least one end of the bottom portion.

17. The assembly according to claim 16, wherein the plate is formed of the same material as the bottom portion.

18. The assembly according to claim 16,
wherein the bottom portion of the first frame member includes opposing edges along a longitudinal direction of the battery cells, the bottom portion including a first region and a second region, the first region being located at at least a first edge of the opposing edges, and the second region being located away from the at least a first edge,
the assembly further comprising a thermally conductive resin layer located between the first frame member and the battery cell stack in the second region.

19. The assembly according to claim 16, further comprising an insulating sheet located between the step and the protrusion of the battery cells.

* * * * *